United States Patent
Wu et al.

(10) Patent No.: US 12,541,306 B2
(45) Date of Patent: Feb. 3, 2026

(54) MEMORY SYSTEMS, HOSTS, ELECTRONIC DEVICES AND OPERATION METHODS AND STORAGE MEDIA THEREOF

(71) Applicant: Yangtze Memory Technologies Co., Ltd., Hubei (CN)

(72) Inventors: Chao Wu, Wuhan (CN); Hongbo Wang, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 8 days.

(21) Appl. No.: 18/603,104

(22) Filed: Mar. 12, 2024

(65) Prior Publication Data
US 2025/0094065 A1    Mar. 20, 2025

(30) Foreign Application Priority Data
Sep. 14, 2023 (CN) .......................... 202311191445.8

(51) Int. Cl.
*G06F 3/06* (2006.01)

(52) U.S. Cl.
CPC .......... *G06F 3/0623* (2013.01); *G06F 3/0659* (2013.01); *G06F 3/0679* (2013.01)

(58) Field of Classification Search
CPC ...... G06F 3/0623; G06F 3/062; G06F 3/0659; G06F 3/0655; G06F 3/0658; G06F 3/0679
See application file for complete search history.

(56) References Cited

U.S. PATENT DOCUMENTS

| | | | |
|---|---|---|---|
| 11,599,457 B1 | 3/2023 | Huang | |
| 2014/0245027 A1* | 8/2014 | Lee | G06F 21/74 |
| | | | 713/193 |
| 2016/0094619 A1 | 3/2016 | Khan et al. | |
| 2016/0342338 A1* | 11/2016 | Wang | G06F 3/0656 |
| 2022/0121588 A1* | 4/2022 | Lin | G06F 9/30101 |
| 2022/0187997 A1* | 6/2022 | Chu | G06F 3/0622 |

(Continued)

FOREIGN PATENT DOCUMENTS

| | | |
|---|---|---|
| CN | 102682848 A | 9/2012 |
| CN | 103366101 A | 10/2013 |
| CN | 110611561 A | 12/2019 |

OTHER PUBLICATIONS

Office Action in Chinese Appln. No. 202311191445.8, mailed on Sep. 12, 2025, 20 pages (with machine translation).

*Primary Examiner* — Tracy A Warren
(74) *Attorney, Agent, or Firm* — Fish & Richardson P.C.

(57) ABSTRACT

The present application describes memory systems, hosts, electronic devices and operation methods, and computer-readable storage media. An example memory system includes: a memory device; a multi-mode circuit having data computing and processing capabilities and configured to: provide a main functional service when in a busy state, and provide an additional functional service when in an idle state, the main functional service including implementation of normal access operations to data stored in the memory device, the additional functional service including implementation of computing services other than the normal access operations to the data stored in the memory device; and a processor coupled to the memory device and the multi-mode circuit and configured to control the memory device and the multi-mode circuit.

20 Claims, 8 Drawing Sheets

(56) References Cited

U.S. PATENT DOCUMENTS

| | | | |
|---|---|---|---|
| 2023/0168825 A1* | 6/2023 | Agrawal | G06F 21/602 |
| | | | 711/163 |
| 2023/0259301 A1* | 8/2023 | Chang | G06F 3/0622 |
| | | | 711/154 |
| 2024/0070090 A1* | 2/2024 | Gonion | G06F 12/1408 |
| 2024/0163077 A1* | 5/2024 | Cooreman | H04L 9/0618 |

* cited by examiner

MEMORY SYSTEMS, HOSTS, ELECTRONIC DEVICES AND OPERATION METHODS AND STORAGE MEDIA THEREOF

CROSS-REFERENCE TO RELATED APPLICATIONS

This application claims priority to Chinese Patent Application No. 202311191445.8, filed on Sep. 14, 2023, which is hereby incorporated by reference in its entirety.

TECHNICAL FIELD

Implementations of the present application relate to the field of semiconductor technologies, and in particular to a memory system, a host, an electronic device and an operation method thereof, and a computer-readable storage medium.

BACKGROUND

Currently, memory devices are widely used in various fields, including embedded systems such as computers and network interconnection apparatuses, as well as voice, image, and data storage products such as digital cameras and digital recorders. Memory devices require memory controllers to manage their functions, such as Error Correction Code (ECC) check, bad block management, address mapping, wear leveling, etc. As the requirements for memory in these products continue to increase, the burden on the memory controller is also getting increasingly heavier, affecting the performance and efficiency of the memory system.

SUMMARY

According to a first aspect of the implementation of the present application, there is provided a memory system, including: a memory device; a multi-mode circuit having data computing and processing capabilities and configured to: provide a main functional service when in a busy state, and provide an additional functional service when in an idle state, the main functional service including implementation of normal access operations to data stored in the memory device, the additional functional service including implementation of computing services other than the normal access operations to the data stored in the memory device; and a processor coupled to the memory device and the multi-mode circuit and configured to control the memory device and the multi-mode circuit.

In the above solution, the multi-mode circuit includes at least one of: an encryption circuit, a decryption circuit, an error correction encoding circuit, an error correction decoding circuit, a data randomization encoding circuit or a data randomization decoding circuit In the above solution, the multi-mode circuit includes the encryption circuit; the main functional service includes encrypting and encoding important data in data to be stored to obtain verification data, the verification data to verify whether the important data has been tampered with; and the additional functional services include computing services that provide secure hashing algorithms for data to be processed.

In the above solution, the processor is configured to: receive a first command, the first command instructing to query the state of the multi-mode circuit; in response to the first command, feed back the state of the multi-mode circuit; and in response to the multi-mode circuit being in the idle state, receive a second command, wherein the second command includes at least configuration parameters corresponding to the additional functional service; the multi-mode circuit is configured to: in response to the second command, perform computation processing according to requirements of the configuration parameters; and the processor is further configured to: receive a third command, the third command instructing to query a result of the computation; and in response to the third command, feed back the result of the computation.

In the above solution, the processor is configured to implement the first command and/or the second command through a command of a small computer system interface (SCSI) bus.

In the above solution, the processor is configured to: receive the third command through a read interface with a priority higher than a preset value; and feed back the result of the computation through a task.

In the above solution, the memory device includes a three-dimensional NAND memory.

According to a second aspect of an implementation of the present application, there is provided a host, including: a host memory and a control unit coupled to the host memory, the control unit being configured to: send a first command, the first command instructing to query a state of a multi-mode circuit in a memory system; receive a feedback on the state of the multi-mode circuit; in response to the feedback that the multi-mode circuit in the memory system is in an idle state, send a second command, the second command including at least configuration parameters corresponding to an additional functional service provided by the multi-mode circuit when being idle; send a third command, the third command instructing to query a result of a computation corresponding to the additional functional service; and receive a feedback on the result of the computation.

In the above solution, the control unit is further configured to: in response to the feedback that the multi-mode circuit is in the idle state, send data to be processed.

According to a third aspect of an implementation of the present application, there is provided an electronic device, including: a host and a memory system coupled to the host; wherein the host is configured to send a first command, the first command instructing to query a state of a multi-mode circuit in the memory system; the memory system is configured to: in response to the first command, feed back the state of the multi-mode circuit; the host is further configured to: in response to the feedback that the multi-mode circuit is in an idle state, send a second command, the second command includes at least configuration parameters corresponding to an additional functional service provided by the multi-mode circuit when being idle; the multi-mode circuit is configured to: in response to the second command, perform computation processing on data to be processed according to requirements of the configuration parameters; the host is further configured to: send a third command, the third command instructing to query a result of the computation corresponding to the additional functional service; and the memory system is further configured to feed back the result of the computation in response to the third command.

In the above solution, the multi-mode circuit includes at least one of: an encryption circuit, a decryption circuit, an error correction encoding circuit, an error correction decoding circuit, a data randomization encoding circuit or a data randomization decoding circuit.

In the above solution, the host is further configured to: in response to the feedback of the idle state, send the data to be processed.

According to a fourth aspect of the implementation of the present application, there is provided an operation method of an electronic device, including: sending, by a host in the electronic device, a first command; feeding back, by a memory system in the electronic device, a state of a multi-mode circuit in the memory system in response to the first command, the first command instructing to query the state of the multi-mode circuit; sending, by the host, a second command in response to a feedback that the multi-mode circuit in the memory system is in an idle state; performing, by the multi-mode circuit in the memory system, computation processing on data to be processed according to requirements of configuration parameters in response to the second command, the second command includes at least the configuration parameters corresponding to an additional functional service provided by the multi-mode circuit when being idle; sending, by the host, a third command, the third command instructing to query a result of the computation corresponding to the additional functional service; and feeding back, by the memory system, the result of the computation in response to the third command.

In the above solution, the multi-mode circuit includes at least one of: an encryption circuit, a decryption circuit, an error correction encoding circuit, an error correction decoding circuit, a data randomization encoding circuit or a data randomization decoding circuit.

According to a fifth aspect of the implementations of the present application, there is provided a computer-readable storage medium storing thereon a computer program, which, when executed by a processor, performs the operation method of any one of the fourth aspect.

Implementations of the present application provide a memory system, a host, an electronic device and an operation method thereof, and a computer-readable storage medium. The memory system includes: a memory device; a multi-mode circuit having data computing and processing capabilities and configured to: provide a main functional service when in a busy state, and provide an additional functional service when in an idle state, the main functional service including implementation of normal access operations to data stored in the memory device, the additional functional service including implementation of computing services other than the normal access operations to the data stored in the memory device; and a processor coupled to the memory device and the multi-mode circuit and configured to control the memory device and the multi-mode circuit. In this way, by utilizing the additional functional services provided by the multi-mode circuit in the memory controller when it is in an idle state, the computational burden of the processor in the memory controller is reduced, without affecting the main functional services provided by the multi-mode circuit. The utilization of the multi-mode circuit is increased, and the performance and efficiency of memory system are improved.

DETAILED DESCRIPTION

Figure 1:
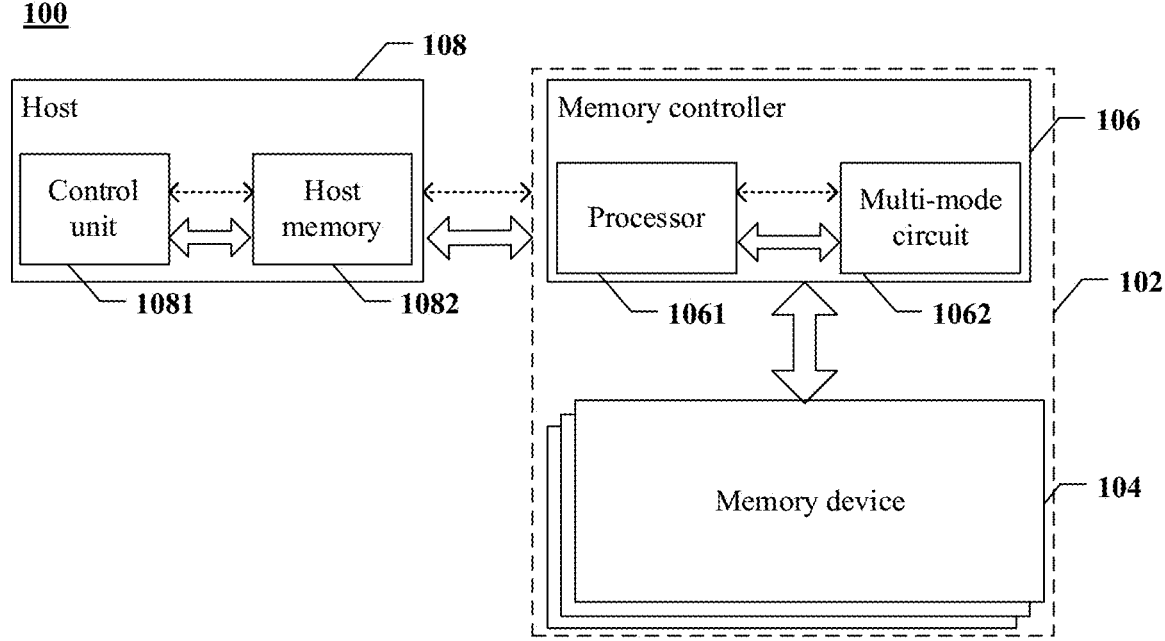
FIG. 1 is a block diagram of an electronic device according to an implementation of the present application.

The technical solutions in the implementations of the present application will be clearly and completely described below in conjunction with the implementations of the present application and the accompanying drawings. The described implementations are only part of the implementations of the present application, but not all of them. Based on the implementations in the present application, all other implementations obtained by persons of ordinary skill in the art without creative efforts fall within the protection scope of the present application.

In the following description, numerous example details are given in order to provide a more thorough understanding of the present application. It will be apparent to one skilled in the art that the present application may be practiced without one or more of these details. In other instances, some technical features known in the art are not described to avoid confusion with the present application; that is, not all features of the actual implementation are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" other elements or layers, it can be directly on, adjacent to, connected to, or coupled to other elements or layers, or intervening elements or layers may be present. In contrast, when an element is referred to as being "directly on," "directly adjacent to," "directly connected to" or "directly coupled to" other elements or layers, there are no intervening elements or layers. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below may represent a second element, component, region, layer or section without departing from the teachings of the present application. When a second element, component, region, layer or section is discussed, it does not indicate that there is necessarily a first element, component, region, layer or section in the present application.

Spatial relationship terms such as "under", "below", "beneath", "underneath", "on", "above" and so on, can be used here for convenience to describe the relationship of one element or feature to other elements or features shown in the figures. It will be understood that the spatially relative terms are intended to encompass different orientations of the device in use and operation in addition to the orientation depicted in the figures. For example, if the device in the figures is turned over, elements or features described as "below" or "under" or "beneath" other elements or features would then be oriented "above" the other elements or features. Thus, the example terms "below" and "beneath" can encompass both orientations of above and below. The device may be otherwise oriented (rotated 90 degrees or at other orientations) and the spatial descriptors used herein may be interpreted accordingly.

The terminology used herein is for the purpose of describing example implementations only and is not to be taken as a limitation of the present application. As used herein, the singular forms "a", "an" and "said/the" are intended to include the plural forms as well, unless the context clearly dictates otherwise. It should also be understood that the terms "consists of" and/or "comprising", when used in this specification, identify the presence of stated features, integers, steps, operations, elements and/or parts, but do not exclude presence or addition of one or more other features, integers, steps, operations, elements, parts and/or groups. As used herein, the term "and/or" includes any and all combinations of the associated listed items.

To thoroughly understand the present application, detailed steps and detailed structures will be provided in the following description, so as to explain the technical solution of the present application. Example implementations of the present application are described in detail as follows, however, the present application may have other implementations in addition to these detailed descriptions.

In the related art, while managing the functions of the memory, the memory controller also needs to undertake the function of computing on a large amount of data, which further increases the burden on the memory controller and not favorable to improving the performance and efficiency of the memory system.

In view of this, implementations of the present application provide a memory system, a host, an electronic device and operation method thereof, and a computer-readable storage medium.

FIG. 1 is a block diagram of an electronic device according to an implementation of the present application. As shown in FIG. 1, according to the first aspect of the implementation of the present application, a memory system is provided. The memory system 102 includes: a memory device 104; a multi-mode circuit 1062, which has data computing and processing capabilities and is configured to: provide the main functional service when in a busy state, and provide the additional functional service when in an idle state, the main functional service including implementing the normal access operations to the data stored in the memory device 104, and the additional functional service including implementing the computing service other than the normal access operations to the data stored in the memory device 104; a processor 1061 coupled to the memory device 104 and the multi-mode circuit 1062, and configured to control the memory device 104 and the multi-mode circuit 1062.

In FIG. 1, the electronic device 100 may be mobile phone, desktop computer, laptop computer, tablet computer, vehicle computer, game console, printer, locator device, wearable electronic device, smart sensor, Virtual Reality (VR) device, Augmented Reality (AR) device or any other suitable electronic device having storage therein.

As shown in FIG. 1, the electronic device 100 includes a host 108 and a memory system 102 having one or more memory devices 104, and a memory controller 106.

It should be noted that the processor 1061 and the multi-mode circuit 1062 are both contained in the memory controller 106. The processor 1061 is typically relied upon to implement the computing functions of the memory controller 106 on large amounts of data. The implementations of the present application reduce the computational burden of the processor 1061 in the memory controller 106 by utilizing additional functional services provided by the multi-mode circuit 1062 in the memory controller 106 when it is in an idle state, while not affecting the multi-mode circuit 1062 to provide main functional services, improving the utilization of multi-mode circuits and the performance and efficiency of memory systems.

In some implementations, the processor in the memory controller may be a Microcontroller Unit (MCU).

In some implementations, the host 108 may be a processor (e.g., Central Processing Unit (CPU)) or a System of Chip (SoC) (e.g., Application Processor (AP)) of the electronic device. The host 108 may be configured to send data to the memory device 104. Alternatively, the host 108 may be configured to send data to or receive data from memory device 104.

In an example, the memory device 104 may be any memory device disclosed in this application, such as a three-dimensional NAND memory. According to some implementations, memory controller 106 is also coupled to host 108. Memory controller 106 may manage data stored in memory device 104 and communicate with host 108.

In some implementations, the memory controller 106 is designed to operate in a low duty-cycle environment such as Secure Digital (SD) cards, Compact Flash (CF) cards, Universal Serial Bus (USB) flash drives, or other media for use in electronic devices with low duty-cycle environments such as personal computers, digital cameras, mobile phones, and the like.

In some implementations, the memory controller 106 is designed to operate in a high duty-cycle environment, such as a Solid State Driver (SSD) or an embedded Muti Media Card (eMMC), where SSD or eMMC is used as data storage for mobile devices with high duty-cycle environments such as smartphones, tablets, laptops and the like as well as enterprise storage arrays.

The memory controller 106 may be configured to control operations of the memory device 104, such as read, erase and program operations. The memory controller 106 may further be configured to manage various functions related to data stored or to be stored in the memory device 104, including but not limited to bad block management, garbage collection, logical-to-physical address translation, wear leveling, and the like. In some implementations, memory controller 106 is further configured to process error correction code on data read from or written to memory device 104.

Memory controller 106 may further perform any other suitable functions, such as formatting memory device 104. Memory controller 106 may communicate with external devices (e.g., host 108) according to a example communication protocol. For example, the memory controller 106 can communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and the one or more memory devices 104 may be integrated into various types of storage devices, e.g., be included in the same package (e.g., a Universal Flash Storage (UFS) package or an eMMC package). That is, the electronic device 100 can be implemented and packaged into different types of end electronic products.

Figure 2A:
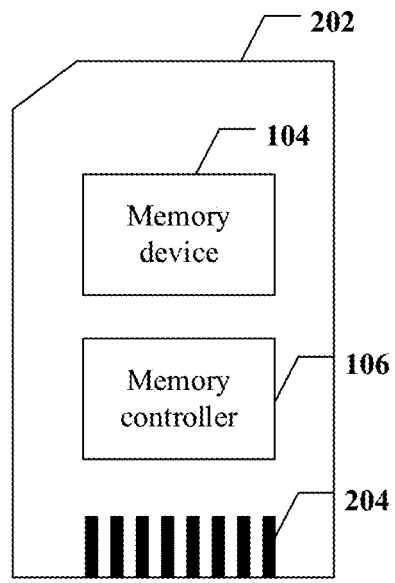
FIG. 2a is a schematic diagram of an example memory card with a memory system according to an implementation of the present application.
Figure 2B:
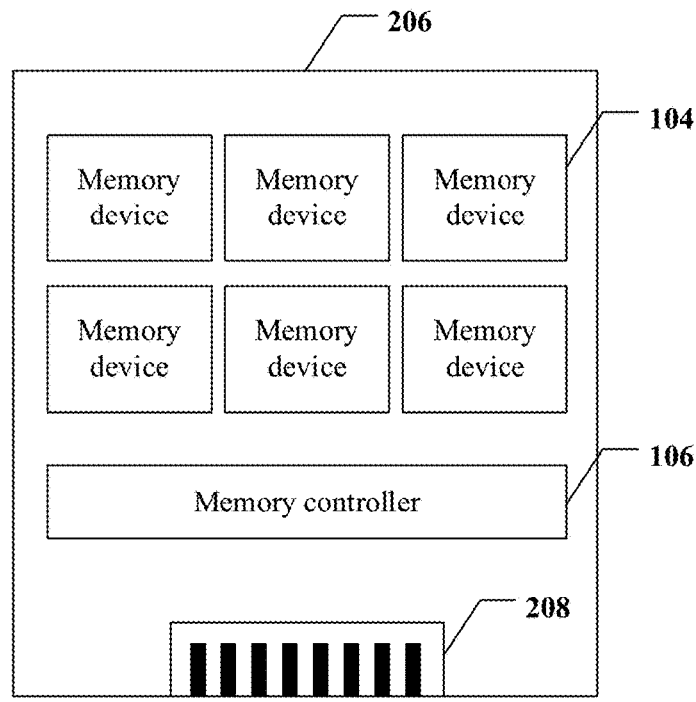
FIG. 2b is a schematic diagram of an example solid state drive with a memory system according to an implementation of the present application.

In one example as shown in FIG. 2a, memory controller 106 and a single memory device 104 may be integrated into memory card 202. The memory card 202 may include a PC card (PCMCIA, Personal Computer Memory Card International Association), CF card, Smart Media (SM) card, memory stick, multimedia card (MMC, RS-MMC, MMC-micro), SD card (SD, miniSD, microSD, SDHC), UFS, etc. The memory card 202 may further include a memory card connector 204 that couples the memory card 202 with a host (e.g., host 108 in FIG. 1). In another example as shown in FIG. 2b, memory controller 106 and multiple memory devices 104 may be integrated into SSD 206. SSD 206 may further include SSD connector 208 that couples SSD 206 to a host (e.g., host 108 in FIG. 1). In some implementations, the storage capacity and/or operating speed of SSD 206 is greater than the storage capacity and/or operating speed of memory card 202.

Figure 3A:
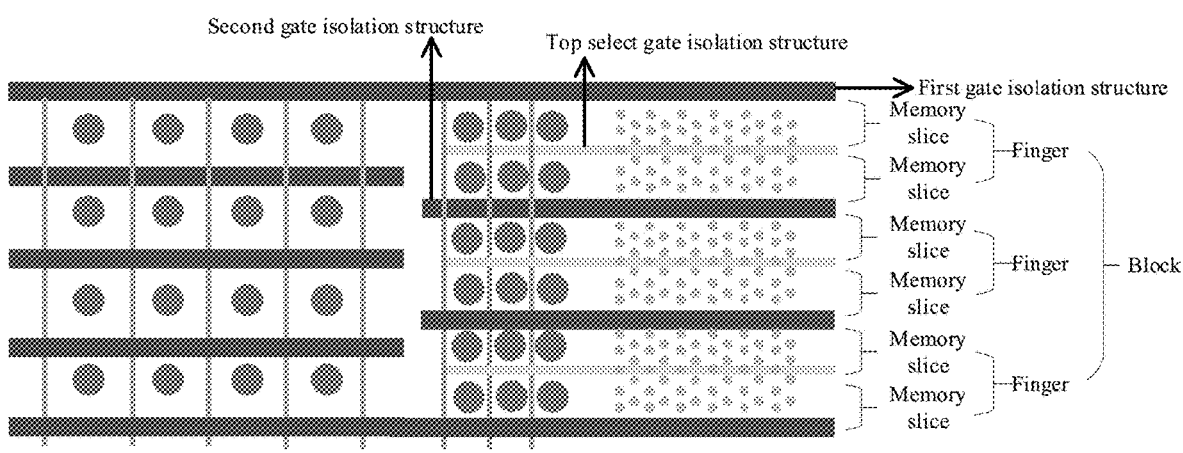
FIG. 3a is a schematic diagram of the distribution of memory cells of a three-dimensional NAND memory according to an implementation of the present application.

A structural schematic diagram of a memory cell array of a three-dimensional NAND memory is given in an example in FIG. 3a. As shown in FIG. 3a, the memory cell array of a three-dimensional NAND memory consists of several memory cell rows parallel to gate isolation structure and staggered in parallel. Every two rows of memory cell are separated by a gate isolation structure and a top selection gate isolation structure, and each memory cell row includes a plurality of memory cells. The gate isolation structure may include a first gate isolation structure and a second gate isolation structure. The first gate isolation structure divides the memory cell array into a plurality of blocks, the plurality of second gate isolation structures divides the blocks into multiple fingers, and the top selection gate isolation structure set in the middle of each finger can divide the finger into two parts, so that the finger is divided into two memory slices. A block shown in FIG. 3a includes 6 memory slices, and in practical applications, the number of memory slices in a block is not limited to this.

In some implementations, each block can be coupled to multiple word lines, and multiple memory cells coupled to each individually controlled word line form a page. By way of example, all memory cells in each memory slice in FIG. 3a are coupled to form a page.

It is noted that the number of memory cell rows between the gate isolation structure and the top selection gate isolation structure shown in FIG. 3a is merely an example, not to define the number of memory cell rows that one finger of a three-dimensional NAND memory of the present application contains. In practical applications, the number of memory cell rows included in a finger can be adjusted according to actual conditions, such as 2, 4, 8, 16, and so on.

Figure 3B:
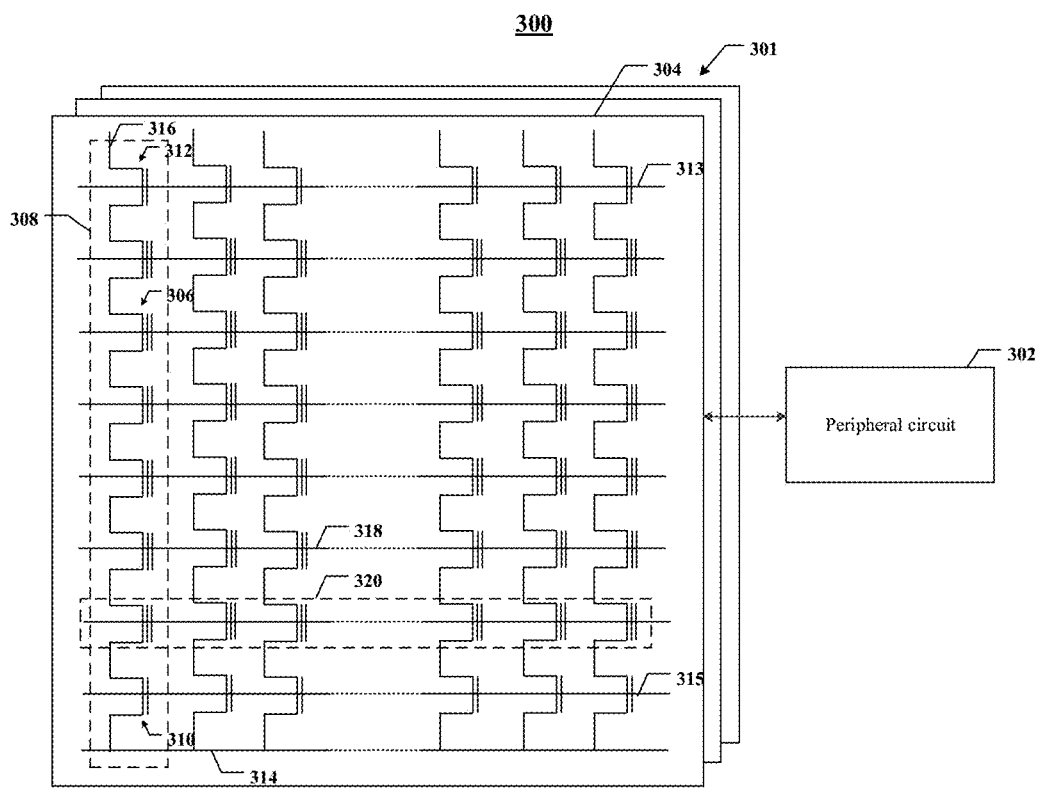
FIG. 3b is a schematic diagram of an example memory including peripheral circuits according to an implementation of the present application.

FIG. 3b shows a schematic circuit diagram of an example memory device 300 including a peripheral circuit in accordance with some aspects of the present application. Memory device 300 may be an example of memory device 104 in FIG. 1. Memory device 300 may include a memory cell array 301 and peripheral circuits 302 coupled to memory cell array 301. The memory cell array 301 is illustrated as an example of a three-dimensional NAND type memory cell array, where the memory cells 306 are NAND memory cells and are provided in the form of an array of memory strings 308, each memory string 308 extending vertically above a substrate (not shown). In some implementations, each memory string 308 includes a plurality of memory cells 306 coupled in series and stacked vertically. Each memory cell 306 may hold a continuous analog value, such as a voltage or charge, depending on the number of electrons trapped within the area of the memory cell 306. Each memory cell 306 may be a floating-gate memory cell including a floating gate transistor, or a charge-trap memory cell including a charge trap transistor.

In some implementations, each memory cell 306 is a Single-Level Cell (SLC) that has two possible memory states and can thus store one bit of data. For example, a first memory state of "0" may correspond to a first voltage range, and a second memory state of "1" may correspond to a second voltage range. In some implementations, each memory cell 306 is a Multi-Level Cell (MLC) capable of storing more than a single bit of data with more than four memory states. For example, MLCs can store two bits per cell (also known as Double-Level Cell), three bits per cell (also known as Trinary-Level Cell (TLC)), four bits per cell (also known as Quad-Level Cell (QLC)), five bits per cell (also known as Penta-Level Cell (PLC)) or more than five bits per cell. Each MLC can be programmed to take a range of possible nominal storage values. In one example, if each MLC stores two bits of data, the MLC can be programmed to take three possible programming levels from the erased state by writing one of three possible nominal storage values into the cell. A fourth nominal storage value may be used for the erased state.

As shown in FIG. 3b, each memory string 308 may include a bottom select transistor 310 (also known as source-side select transistor, including source select gate BSG) at its source terminal and a top select transistor 312 (also known as drain-side select transistor, including drain select gate TSG) at its drain terminal. A source select transistor and a drain select transistor may be configured to activate a selected memory string 308 during read and program operations. In some implementations, the sources of the memory strings 308 in the same block 304 are coupled by the same source line (SL) 314 (e.g., a common SL). In other words, according to some implementations, all memory strings 308 in the same block 304 have an array common source (ACS). According to some implementations, the TSG of each memory string 308 is coupled to a corresponding bit line (BL) 316 from which data can be read or written via an output bus (not shown). In some implementations, each memory string 308 is configured to be selected or deselected by applying to corresponding TSG a select voltage (e.g., higher than a threshold voltage of a transistor with TSG) or a deselection voltage (for example, 0V) via one or more TSG line 313, and/or, by applying to corresponding BSG a select voltage (e.g., higher than a threshold voltage of a transistor with BSG) or a deselection voltage (for example, 0V) via one or more BSG line 315.

As shown in FIG. 3b, a memory string 308 may be organized into multiple blocks 304, each of which may have a common source line 314 (e.g., coupled to ground). In some implementations, each block 304 is the basic unit of data for an erasure operation, i.e., all memory cells 306 on the same block 304 are erased simultaneously. To erase the memory cells 306 in a selected block 304, an erasure voltage (Vers) (e.g., a high positive voltage (e.g., 20V or higher)) is bias coupled to a source line 314 of the selected block 304 and to unselected blocks 304 in the same plane as the selected block 304. It should be understood that, in some examples, erasure operations may be performed at the half block level, at the quarter block level, or at any suitable number of blocks or any fraction of blocks. Memory cells 306 of adjacent memory strings 308 may be coupled by word lines 318 that select which row of memory cells 306 is affected by read and program operations. In some implementations, with reference to the FIG. 3a above, the plurality of memory cells are isolated by the top selection gate isolation structure and the gate isolation structure, and multiple memory cells between the top selection gate isolation structure and the gate isolation structure are arranged into multiple memory cell rows, and each memory cell row is parallel to the gate isolation structure and the top selection gate isolation structure. The memory cells in a memory slice sharing the same word line form a physical page 320, and each physical page 320 can be mapped to at least one logical page according to storage mode of the corresponding memory cell 306 (e.g., SLC or MLC as mentioned above). A logical page can constitute the basic data unit for program and read operations.

Referring to FIGS. 3a and 3b, each memory cell 306 of the plurality of memory cells is coupled to a corresponding word line 318, and each memory string 308 is coupled to corresponding bit lines 316 via a corresponding select transistor (such as a top select transistor (TSG)).

Figure 4:
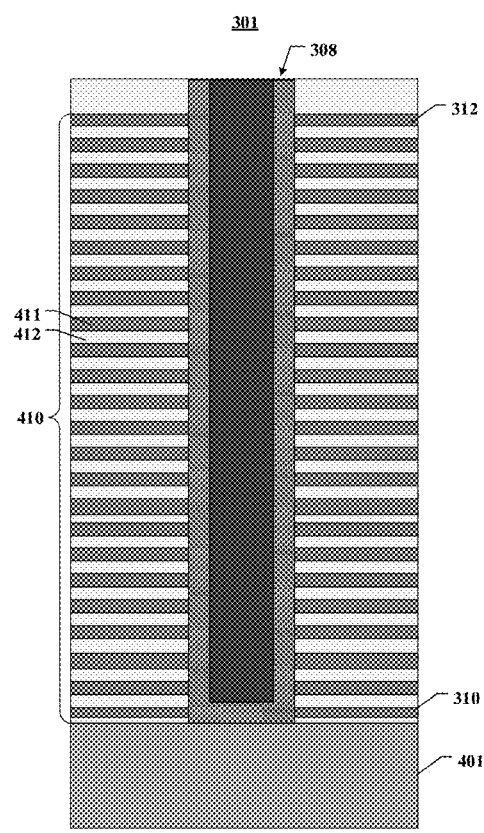
FIG. 4 is a schematic cross-sectional view of a memory cell array including NAND memory strings according to an implementation of the present application.

FIG. 4 illustrates a schematic cross-sectional view of an example memory cell array 301 including memory strings 308, exemplified by NAND, in accordance with aspects of the present application. As shown in FIG. 4, the NAND memory cell array 301 may include a stacked structure 410, which includes a plurality of gate layers 411 and a plurality of insulating layers 412 alternately stacked in sequence, and a channel structure vertically penetrating through the gate layers 411 and the insulating layers 412. The channel structure is coupled with each gate layer to form a memory cell, and the channel structure is coupled with multiple gate layers in the stacked structure 410 to form a memory string 308. The gate layer 411 and the insulating layer 412 can be stacked alternately, and two adjacent gate layers 411 are separated by an insulating layer 412.

A constituent material of the gate layer 411 may include an electrically conductive material, which may include, but are not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may include a control gate surrounding the memory cell. The gate layer 411 at the top of the stacked structure 410 may extend laterally as a top select gate line, the gate layer 411 at the bottom of the stacked structure 410 may extend laterally as a bottom select gate line, and the gate layers 411 extending laterally between the top select gate line and the bottom selection gate line may serve as word line layers.

In some implementations, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable materials.

In some implementations, a memory string 308 includes a channel structure extending vertically through stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer and the barrier layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
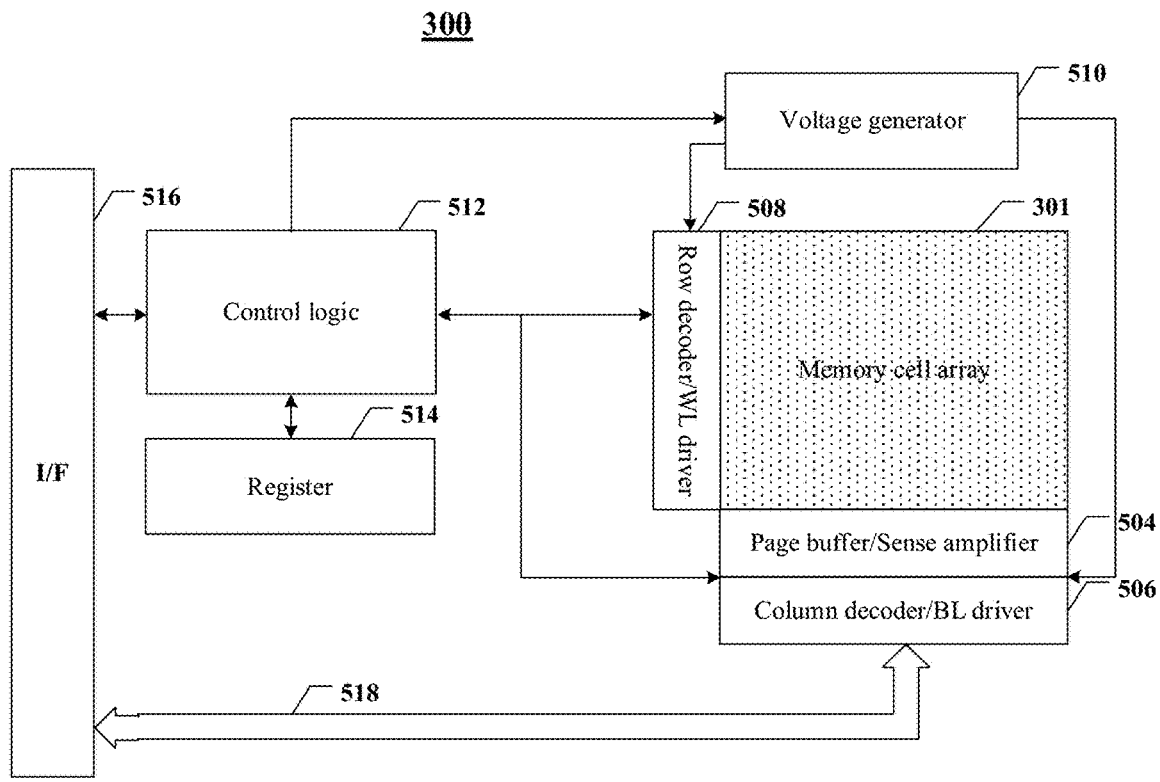
FIG. 5 is a schematic diagram of an example memory device including a memory cell array and peripheral circuits according to an implementation of the present application.

Referring back to FIG. 3b, a peripheral circuit 302 may be coupled to a memory cell array 301 through a bit line 316, a word line 318, a source line 314, a BSG line 315, and a TSG line 313. A peripheral circuit 302 may include any suitable analog, digital, and mixed-signal circuit for applying voltage and/or current signals to each target memory cell 306 and sensing voltage signals and/or current signals from each target memory cell 306 via a bit line 316, a word line 318, a source line 314, a BSG line 315, and a TSG line 313, so as to facilitate operation of the memory cell array 301. The peripheral circuit 302 may include various types of peripheral circuits formed using metal-oxide-semiconductor (MOS) technology. For example, some example peripheral circuits are shown in FIG. 5. The peripheral circuit 302 includes a page buffer/sense amplifier 504, a column decoder/bit line driver 506, a row decoder/word line driver 508, a voltage generator 510, a control logic 512, a register 514, an interface (I/F) 516 and a data bus 518. It should be understood that in some examples, additional peripheral circuit not shown in FIG. 5 may further be included.

Page buffer/sense amplifier 504 may be configured to read data from and program (write) data to the memory cell array 301 according to control signals from the control logic 512. In one example, the page buffer/sense amplifier 504 may store a page of program data (write data) to be programmed into memory cell array 301. In another example, page buffer/sense amplifier 504 may perform a program verify operation to ensure that data has been correctly programmed into the memory cell 306 coupled to the selected word line 318. In yet another example, the page buffer/sense amplifier 504 may further sense a low power signal from bit line 316 representing a data bit stored in the memory cell 306 and amplify the small voltage swing to a recognizable logic level during a read operation. The column decoder/bit line driver 506 may be configured to be controlled by control logic 512 and to select one or more memory strings 308 by applying bit line voltages generated from voltage generator 510.

The row decoder/word line driver 508 may be configured to be controlled by the control logic 512 and select/deselect blocks 304 of the memory cell array 301 and select/deselect word lines 318 of the blocks 304. The row decoder/wordline driver 508 may further be configured to drive the wordline 318 using a wordline voltage generated from the voltage generator 510. In some implementations, the row decoder/wordline driver 508 can further select/deselect and drive the BSG line 315 and the TSG line 313. As described in detail below, the row decoder/word line driver 508 is configured to perform program operations on the memory cells 306 coupled to the selected word line(s) 318. The voltage generator 510 may be configured to be controlled by the control logic 512 and generate word line voltages (e.g., read voltages, program voltages, pass voltages, channel boost voltages, verify voltages, etc.), bit line voltages and source line voltage to be supplied to the memory cell array 301.

The control logic 512 may be coupled to each other part of the peripheral circuits described above and configured to control the operations of each other part of the peripheral circuits. Registers 514 may be coupled to the control logic 512 and include status registers, command registers and address registers for storing status information, command operation codes (OP codes) and command addresses for controlling the operations of each peripheral circuit. The interface 516 may be coupled to the control logic 512 and act as a control buffer to buffer and relay control commands received from a host (not shown) to control logic 512 and to buffer status information received from control logic 512 and relay it to the host. The interface 516 may further be coupled to the column decoder/bit line driver 506 via the data bus 518 and act as a data I/O interface and a data buffer to buffer and relay data to or from memory cell array 301.

Next, focus is put on the introduction of the multi-mode circuit 1062. The multi-mode circuit 1062 has two different working modes: one working mode is to provide a main functional service when being in a busy state, the main functional service including implementing normal access operations to data stored in the memory device 104; the other working mode is to provide an additional functional service when being in an idle state, the additional functional services including implementing computing services other than normal access operations to data stored in the memory device 104.

In some implementations, the multi-mode circuit 1062 includes at least one of: an encryption circuit, a decryption circuit, an error correction encoding circuit, an error correction decoding circuit, a data randomization encoding circuit or a data randomization decoding circuit.

The multi-mode circuit (such as an encryption circuit, decryption circuit, error correction encoding circuit, error correction decoding circuit, data randomization encoding circuit or data randomization decoding circuit, etc.) is typically a functional circuit that is configured to implement requirements on data security, data integrity, or data reliability. Since not all usage scenarios need to implement these requirements, the multi-mode circuit will be in idle state in the absence of these requirements. It is understood that the main function utilization of a multi-mode circuit is greatly reduced due to limitations by actual requirements.

It is understood that among the various circuits mentioned above, the application scenario of the encryption circuit configured to encrypt important data in the data to be stored is the most special (only a small amount of the accessed data will be important data, and encryption circuits and decryption circuits are used only for important data), and thus its main function utilization is the lowest. Based on this, if the additional functions of the circuit with the lowest main function utilization can be developed and maximized, the effective utilization of multi-mode circuits will be greatly improved.

In some implementations, the multi-mode circuit 1062 includes an encryption circuit; the main functional service includes encrypting and encoding important data in data to be stored to obtain check data, the check data to verify whether the important data has been tampered with; and the additional functional services include computing services that provide secure hashing algorithms for data to be processed.

In some example implementations, the storage area of the three-dimensional NAND memory is divided into four categories, including User Data Area (UDA), Replay Protected Memory Block (RPMB), and Boot Area Partition and General Purpose Partition (GPP). Among them, the user data area is generally the largest partition in eMMC and the primary storage area in actual products. The user data area mainly stores data generated during daily use by users, such as photos, recordings, logs, etc. The boot area partition is mainly used to store the Bootloader. Bootloader is a small program that runs before the operating system kernel runs. Through this small program, hardware devices may be initialized and a memory space map may be established, thereby bringing the system's software and hardware environments to a suitable state, so as to prepare the correct environment for the final call to a kernel of the operating system. General purpose partitions are primarily configured to store system and application data.

The replay protection memory block partition is a partition with security features. When writing data into RPMB, the validity of the data will be verified, and only the designated host can write. In practical applications, RPMB is typically configured to store some important data that needs to be prevented from illegal tampering, such as public keys and serial numbers related to fingerprint payment.

Before storing these important data in RPMB, the encryption unit will first encrypt and encode the important data in the data to be stored to obtain check data. For example, the host and the three-dimensional NAND memory share a key. Before the host sends to the three-dimensional NAND memory the important data in the data to be stored, the key and the Secure Hash Algorithm (SHA) are used to generate Message Authentication Code (MAC). The host sends the important data in the data to be stored to the three-dimensional NAND memory together with the MAC. The three-dimensional NAND memory re-computes the MAC for the received important data and the shared key in the data to be stored, and then compares the computed MAC to the received MAC. If they are consistent, the authentication is successful, and the important data in the data to be stored is written into RPMB, otherwise the writing of the data will be rejected.

Since the check data is computed based on the original data, once the data is tampered with, the check data will also change accordingly, so that it can be verified based on the check data whether important data has been tampered with.

In some implementations, the check data is a message authentication code, which is used to verify the integrity of the data to determine whether the data has been tampered with during storage or transmission.

In some implementations, secure hash algorithms include, but are not limited to, SHA160 algorithm, SHA256 algorithm, and SHA512 algorithm.

In other implementations, additional functional services include providing computing services including but not limited to symmetric algorithms and asymmetric algorithms for data to be processed.

In an example, the multi-mode circuit 1062 may also include a decryption circuit; the main functional service includes decrypting and decoding encrypted and encoded data, and verifying whether the visitor has access to the encrypted data to ensure that authorized users or applications can access to and use such data when needed; and additional functional services include computing services that provide secure hashing algorithms for the data to be processed.

It should be noted that the design and implementation of the decryption circuit needs to match the used encryption algorithm. Different applications and systems may use different encryption algorithms. For this reason, the actual implementation of the decryption circuit may be different.

In some implementations, additional functional services provided by the decryption circuit include providing computing services including but not limited to SHA160 algorithm, SHA256 algorithm and SHA512 algorithm for the data to be processed.

In other implementations, the additional functional services provided by the decryption circuit include providing computing services including but not limited to symmetric algorithms and asymmetric algorithms for the data to be processed.

In an example, the multi-mode circuit 1062 may also include an error correction encoding circuit; the main functional service includes encoding the data to be stored and obtaining check data, the check data to detect and correct possible errors during data transmission; additional functions services include computing services that provide logical operations on data to be processed, where logical operations include but are not limited to: exclusive OR (XOR) operations, AND operations, OR operations, NOT operations, and logical shift operations.

In an example, the multi-mode circuit 1062 may also include an error correction decoding circuit; the main functional service includes decoding the received or read data to obtain check data corresponding to the check data generated by the error correction encoding circuit to verify whether the received or read data is consistent with the data encoded when sent; and additional functional services include computing services that provide logical operations for the data to be processed, wherein logical operations include but are not limited to: exclusive OR (XOR) operations, AND Operations, OR operations, NOT operations, and logical shift operations.

In an example, the multi-mode circuit 1062 may also include a data randomization encoding circuit; the main functional service includes encoding original data through randomization during data transmission or storage to enhance data security, reduce the risk of unauthorized access to data, and avoid the threats of malicious attacks and data leaks, that is, even if an attacker intercepts the encoded data in time, it will be difficult to restore the original information; and additional functional services include computing services that provide logical operations for the data to be processed, wherein the logical operations include but do not limited to exclusive OR (XOR) operations.

In an example, the multi-mode circuit 1062 may also include a data randomization decoding circuit; the main functional service includes decoding the data that has been encoded by data randomization and restoring it into the form of the original data for subsequent processing and use; and additional functions services include computing services that provide logical operations on data to be processed, wherein logical operations include but are not limited to exclusive OR (XOR) operations.

It should be noted that the data randomization decoding circuit is typically used in conjunction with the data randomization encoding circuit to ensure that during the data transmission or storage process, the data encoded through randomization can be correctly restored into the original data while maintaining data security and integrity.

In some implementations, the processor is configured to: receive a first command, the first command instructing to query the state of the multi-mode circuit; in response to the first command, feed back the state of the multi-mode circuit; and in response to the multi-mode circuit being in the idle state, receive a second command, wherein the second command includes at least configuration parameters corresponding to the additional functional service; the multi-mode circuit is configured to: in response to the second command, perform computation processing according to the requirements of the configuration parameters; and the processor is further configured to: receive a third command, the third command instructing to query a result of the computation; and in response to the third command, feed back the result of the computation.

To prevent the main functional services of the multi-mode circuit from being affected, it is desired to query the state of the multi-mode circuit and decide whether to utilize its additional functional services based on the state of the multi-mode circuit. The processor is configured to query the state of the multi-mode circuit in response to the first command, and feed back the state of the multi-mode circuit to an external device (e.g., a host).

When the multi-mode circuit is in an idle state, the multi-mode circuit is configured to perform computation processing according to the requirements of the configuration parameters in response to the second command.

The configuration parameters include but are not limited to an algorithm mode, algorithm loop times, and initialization data.

In some implementations, the algorithm mode in the configuration parameters is related to the type of the multi-mode circuit. For example, when the multi-mode circuit is an encryption circuit, the algorithm mode may be a secure hash algorithm. When the multi-mode circuit is an error correction encoding circuit, the algorithm mode can be a logical shift algorithm.

Figure 6:
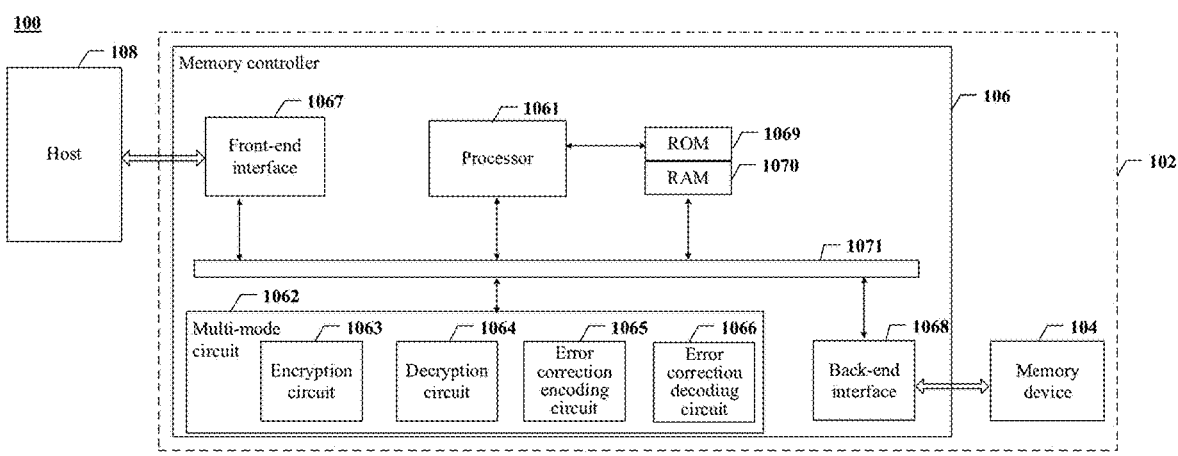
FIG. 6 is a block diagram of an electronic device according to another implementation of the present application.

FIG. 6 is a block diagram of an electronic device according to another implementation of the present application. As shown in FIG. 6, electronic device 100 includes a host 108 and a memory system 102 having one or more memory devices 104 and a memory controller 106. The memory controller 106 includes a processor 1061, a multi-mode circuit 1062, a Read-Only Memory (ROM) 1069, a Random Access Memory (RAM) 1070, a front-end interface 1067 and a back-end interface 1068.

The front-end interface 1067 is a connection interface between the host 108 and the memory controller 106. The front-end interface 1067 allows the host and the memory controller to communicate according to an example protocol, to send read and write requests, and to perform other operations. The back-end interface 1068 is a connection interface between the memory controller 106 and the memory device 104, and the backend interface 1068 allows data to be transferred between the memory controller 106 and the memory device 104.

ROM 1069 typically contains firmware or firmware program code for the memory controller 106 to initialize and operate various components of the memory controller. RAM 1070 is typically configured to cache data.

The multi-mode circuit 1062 includes an encryption circuit 1063, a decryption circuit 1064, an error correction encoding circuit 1065, and an error correction decoding circuit 1066. Among them, the main functional service of the encryption circuit 1063 includes encrypting and encoding important data in the data to be stored to obtain check data, wherein the check data is used to verify whether the important data has been tampered with. The main functional service of the decryption circuit 1064 includes decrypting and decoding the encrypted and encoded data, and verifying whether the visitor has access to the encrypted data to ensure that authorized users or applications access and use the data as needed. The additional functional services of the encryption circuit 1063 and the decryption circuit 1064 include providing computing service including secure hashing algorithms for data to be processed.

The main functional services of the error correction encoding circuit 1065 include encoding the data to be stored to obtain check data, wherein the check data is used to detect and correct possible errors during data transmission. The main functional services of the error correction decoding circuit 1066 include decoding the received or read data to obtain check data corresponding to the check data generated by the error correction encoding circuit to verify whether the received or read data is consistent with the data encoded when sent. Additional functional services of the error correction encoding circuit 1065 and the error correction decoding circuit 1066 include computing services that provide logical operations for the data to be processed, wherein the logical operations include but are not limited to: exclusive OR (XOR) operation, AND operation, OR operation, NOT operation, and logical shift operation.

As shown in FIG. 6, various components of memory controller 106 may be connected to bus 1071.

It should be noted that when the multi-mode circuit includes multiple circuits such as an encryption circuit, a decryption circuit, an error correction encoding circuit and an error correction decoding circuit, the processor is configured to query the states of all circuits in the multi-mode circuit in response to the first command, and feed back the states of the above multiple circuits to the external device (such as the host 108). The algorithm mode in the configuration parameters may include an algorithm mode corresponding to one of the abovementioned plurality of circuits in the idle state.

In some implementations, the processor is further configured to feed back the results of a computation obtained by the computing service of the additional functions of the multi-mode circuit to the external device (e.g., the host) in response to the third command. In an example, the processor reads the results of the computation in the multi-mode circuit and transmits them to the external device.

It should be noted that when the multi-mode circuit is providing additional functional services, if the external device sends a request instructing the multi-mode circuit to provide the main functional service, for example, the external device sends a request to write important data into the memory device, then the multi-mode circuit will suspend the provision of additional functional services and give priority to the main functional services. While the main functional service is being provided, the additional functional service is waiting or completed by other parts (such as the processor). In this way, the implementations of the present application reduce the computational burden of the processor in the memory controller by utilizing the additional functional services provided by the multi-mode circuit in the memory controller when it is in an idle state, without affecting the main functional services provided by the multi-mode circuit, improving the utilization of multi-mode circuits and the performance and efficiency of memory systems.

In other implementations, multi-mode circuit and processors may perform computing services simultaneously. It can be understood that in order to speed up the memory controller's computation of a large amount of data, computing services for a part of the data are provided by the processor, and computing services for another part of the data are provided by the multi-mode circuit. In this way, the speed of computing services is significantly increased and the load on the processor is reduced.

In some implementations, the processor is configured to implement the first command and/or the second command through a command of a small computer system interface (SCSI) bus.

The SCSI interface is a computer external device connection standard used to connect and manage external devices. On the one hand, the SCSI interface allows multiple devices to be connected to the same SCSI bus. Each device has a unique SCSI address. Therefore, the SCSI interface can connect multiple devices at the same time without the need for multiple independent interfaces. On the other hand, SCSI defines a set of standard commands that allow the host to communicate with connected devices by issuing commands to perform various operations (such as reading, writing, and so on).

By utilizing the SCSI interface of the memory system itself to implement the transmission of the first command and/or the second command, no additional interfaces and hardware settings are required, which helps to simplify the system architecture and reduce possible compatibility and integration issues. In addition, the existing SCSI interface can be used to improve the efficiency and speed of data transmission. Furthermore, the cost of adding new interfaces, including hardware design, production and maintenance costs, is avoided to improve efficiency and reduce costs.

In some implementations, the processor is configured to: receive the third command through a read interface with a priority higher than a preset value; and feed back the result of the computation through a task.

In some implementations, the processor manages the order of execution of different tasks or operations through priority control. In an example, the processor is configured to have different priority levels, and the priority of the read operation of querying computation result is set to be higher than a preset value. Therefore, the processor receives the third command through the read interface with a priority higher than the preset value, and prioritize the read operation for querying computation results.

The task method allows other tasks to be processed in the background while the processor is executing a task. That is, the processor can process other tasks in the background simultaneously when executing the task of querying the results of a computation after receiving the third command, without having to wait for the results of the computation to be queried before performing other tasks. In this way, the efficiency and responsiveness of the system can be improved.

As shown in FIG. 1, according to a second aspect of the implementation of the present application, a host is provided. The host 108 includes: a host memory 1082 and a control unit 1081 coupled to the host memory 1082. The control unit 1081 is configured to: send a first command, the first command instructing to query a state of a multi-mode circuit in a memory system; receive a feedback on the state of the multi-mode circuit; in response to the feedback that the multi-mode circuit in the memory system is in an idle state, send a second command, the second command including at least configuration parameters corresponding to an additional functional service provided by the multi-mode circuit when being idle; send a third command, the third command instructing to query a result of a computation corresponding to the additional functional service; and receive a feedback on the result of the computation.

Here, the structure of the host refers to FIG. 1 as mentioned above and will not be described again here.

To avoid the main functional service of the multi-mode circuit from being affected, it is desired the control unit 1081 of the host 108 to query the state of the multi-mode circuit and decide whether to use its additional functional services based on the received state of the multi-mode circuit. The control unit 1081 is configured to send a first command to query the state of the multi-mode circuit, and receive feedback on the state of the multi-mode circuit.

In some implementations, the control unit 1081 is configured to send a second command in response to feedback that the multi-mode circuit in the memory system is in an idle state, and the second command includes at least configuration parameters corresponding to the additional functional service provided by the multi-mode circuit when idle.

In some implementations, the control unit 1081 is further configured to send the data to be processed in response to feedback that the multi-mode circuit is in an idle state.

For example, the control unit 1081 may send the data to be processed before, at the same time or after sending the second command in response to the feedback that the multi-mode circuit is in an idle state. That is, the timing of sending the data to be processed is not limited and can be selected depending on actual situations.

In an example implementation, the control unit 1081 sends the data to be processed while sending the second command. In other words, the second command may include data to be processed.

It should be noted that the data to be processed can be understood as the data to be computed.

In some implementations, configuration parameters include, but are not limited to, algorithm modes, algorithm loop times, and initialization data.

In some implementations, the algorithm mode in the configuration parameters is related to the type of the multi-mode circuit. For example, when the multi-mode circuit is an encryption circuit, the algorithm mode may be a secure hash algorithm. When the multi-mode circuit is an error correction encoding circuit, the algorithm mode can be a logical shift algorithm.

In some implementations, the control unit 1081 is configured to query the result of a computation corresponding to the additional functional service in response to sending the third command and receive feedback on the result of the computation. In an example, the processor reads the computation result in the multi-mode circuit, and the control unit 1081 receives feedback on the result of the computation from the processor.

Figure 7:
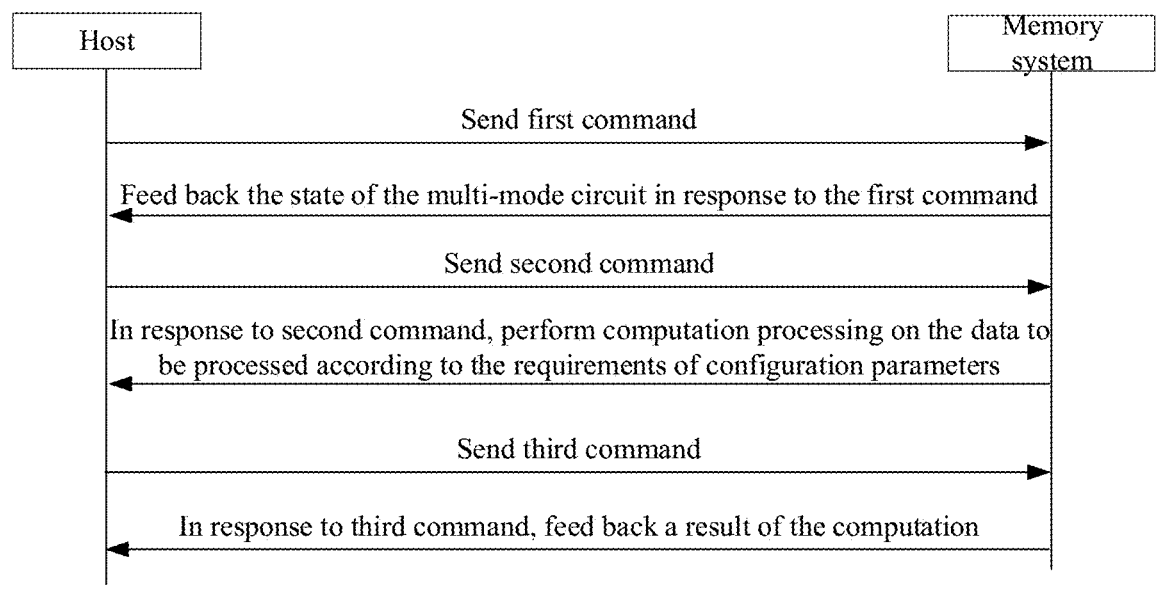
FIG. 7 is a schematic diagram of instruction communication in an electronic device according to an implementation of the present application.

Based on the above host and memory system, an implementation of the present application also provides an electronic device. With reference to FIG. 7, a schematic diagram of instruction communication in an electronic device according to an implementation of the present application is shown.

As shown in FIG. 7, according to a third aspect of the implementation of the present application, an electronic device is provided. The electronic device includes a host and a memory system coupled to the host. The host is configured to send a first command, the first command instructing to query a state of a multi-mode circuit in the memory system; the memory system is configured to: in response to the first command, feed back the state of the multi-mode circuit; the host is further configured to: in response to the feedback that the multi-mode circuit is in an idle state, send a second command, the second command includes at least configuration parameters corresponding to an additional functional service provided by the multi-mode circuit when being idle; the multi-mode circuit is configured to: in response to the second command, perform computation processing on data to be processed according to requirements of the configuration parameters; the host is further configured to: send a third command, the third command instructing to query a result of the computation corresponding to the additional functional service; and the memory system is further configured to feed back the result of the computation in response to the third command.

Reference may be made to the relevant descriptions in the above implementations for the structure of the electronic device which will not be described again here.

It should be noted that the solid arrows in FIG. 1 illustrate the instruction communication path in the electronic device when the multi-mode circuit provides the main functional service. The dotted arrows in FIG. 1 illustrate the instruction communication path in electronic devices when multi-mode circuits provide additional functional services.

In some implementations, the multi-mode circuit 1062 includes at least one of: an encryption circuit, a decryption circuit, an error correction encoding circuit, an error correction decoding circuit, a data randomization encoding circuit, or a data randomization decoding circuit.

In some implementations, the multi-mode circuit 1062 includes an encryption circuit; the main functional services include encrypting and encoding important data in the data to be stored to obtain check data, the check data to verify whether the important data has been tampered with; and additional functional services include providing computing services of secure hash algorithms for the data to be processed.

In some implementations, secure hash algorithms include, but are not limited to, SHA160 algorithm, SHA256 algorithm, and SHA512 algorithm.

In other implementations, additional functional services include providing computing services including but not limited to symmetric algorithms and asymmetric algorithms for data to be processed.

In an example, the multi-mode circuit 1062 includes an error correction encoding circuit; the main functional services include encoding the data to be stored to obtain check data, the check data to detect and correct possible errors during data transmission; and additional functional services include providing computing services of logical operations for the data to be processed, wherein logical operations include but are not limited to an exclusive OR (XOR) operation, AND operation, OR operation, NOT operation, and logical shift operation.

In some implementations, the host 108 is further configured to send the data to be processed in response to feedback of the idle state.

For example, the host 108 may send the data to be processed before, at the same time or after sending the second command in response to the feedback that the multi-mode circuit is in an idle state. That is, the timing of sending the data to be processed is not limited and can be selected depending on actual situations.

In an example implementation, the host 108 sends the data to be processed while sending the second command. In other words, the second command may include data to be processed.

Figure 8:
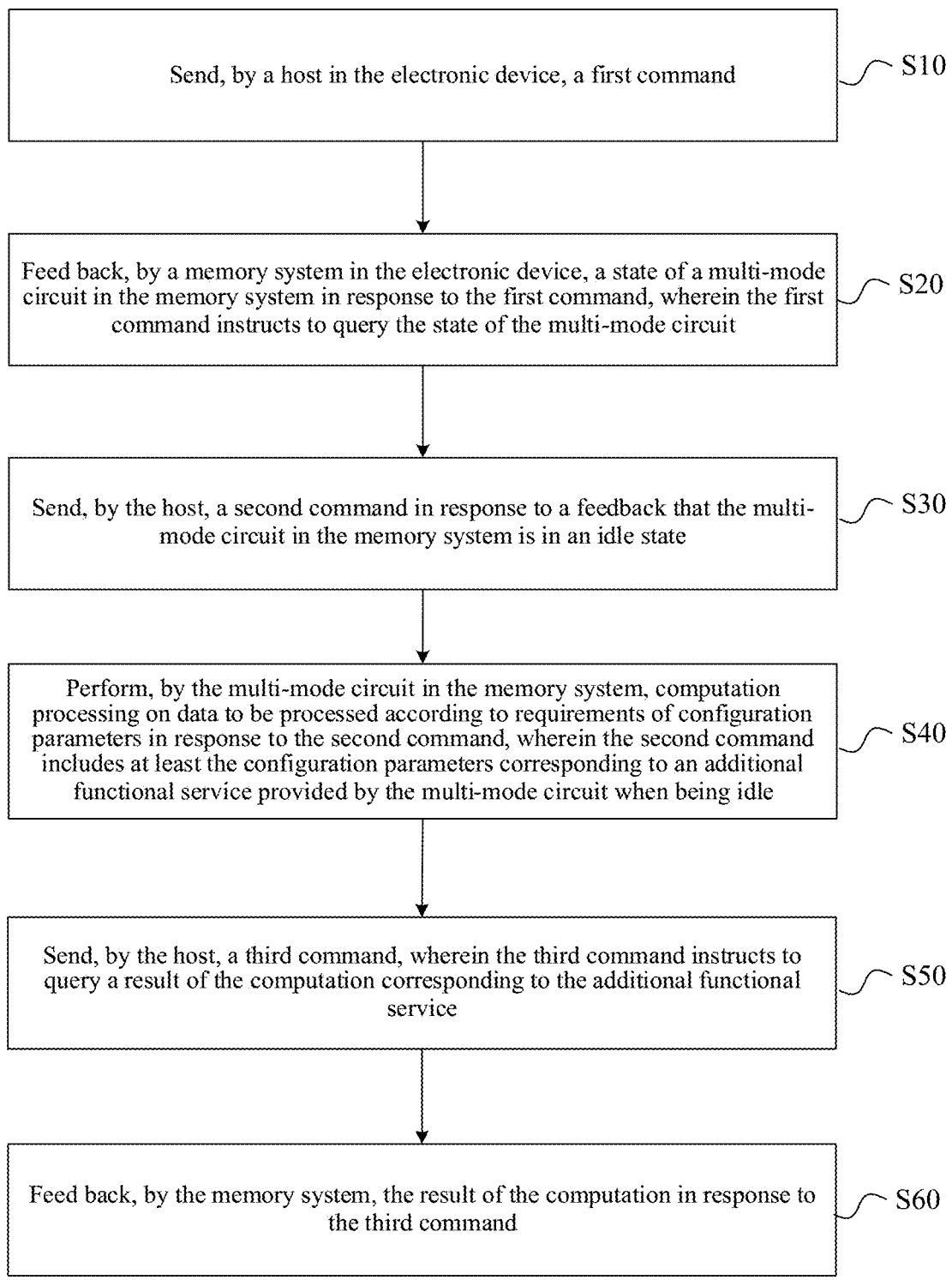
FIG. 8 is a schematic flowchart of the implementation of the operation method of an electronic device according to an implementation of the present application.

FIG. 8 is a schematic flow chart of an implementation of the operation method of an electronic device according to an implementation of the present application. According to the fourth aspect of the present application, an implementation of the present application provides an operation method of an electronic device. With reference to FIGS. 7 and 8, the operation method of the electronic device includes the following operations in an example.

Operation S10: sending, by a host in the electronic device, a first command.

Operation S20: feeding back, by a memory system in the electronic device, a state of a multi-mode circuit in the memory system in response to the first command, the first command instructing to query the state of the multi-mode circuit.

Operation S30: sending, by the host, a second command in response to a feedback that the multi-mode circuit in the memory system is in an idle state.

Operation S40: performing, by the multi-mode circuit in the memory system, computation processing on data to be processed according to requirements of configuration parameters in response to the second command, the second command includes at least the configuration parameters corresponding to an additional functional service provided by the multi-mode circuit when being idle.

Operation S50: sending, by the host, a third command, the third command instructing to query a result of the computation corresponding to the additional functional service.

Operation S60: feeding back, by the memory system, the result of the computation in response to the third command.

In some implementations, the first command and/or the second command are implemented through commands of the Small Computer System Interface (SCSI) bus. The host and memory system implement the transmission of the first command and/or the second command through the existing SCSI interface, which helps to simplify the structure, improve efficiency and reduce costs.

In some implementations, the third command is transmitted through a read interface with a priority higher than a preset value, and the computation result is fed back through a task.

For example, the priority of the read operation of querying the results of a computation is set to be higher than a preset value. Therefore, the host and the memory system will receive the third command through the read interface with a priority higher than the preset value, and prioritize the transmission of the results of the computation.

The task method allows other tasks to be processed in the background while the processor of the memory system is executing the task. That is, the processor can process other tasks in the background simultaneously when executing the task of querying the results of the computation after receiving the third command, without having to wait for the results of the computation to be queried before performing other tasks. In this way, the efficiency and responsiveness of electronic devices can be improved.

In some implementations, the multi-mode circuit includes at least one of the following: an encryption circuit, a decryption circuit, an error correction encoding circuit, an error correction decoding circuit, a data randomization encoding circuit, or a data randomization decoding circuit.

In some implementations, the multi-mode circuit 1062 includes an encryption circuit; the main functional services include encrypting and encoding important data in the data to be stored to obtain check data, the check data to verify whether the important data has been tampered with; and additional functional services include providing computing services including secure hash algorithm for the data to be processed.

In some implementations, secure hash algorithms include, but are not limited to, SHA160 algorithm, SHA256 algorithm, and SHA512 algorithm.

In other implementations, additional functional services include providing computing services including but not limited to symmetric algorithms and asymmetric algorithms for data to be processed.

In an example, the multi-mode circuit 1062 includes an error correction encoding circuit; the main functional services include encoding the data to be stored to obtain check data, the check data to detect and correct possible errors during data transmission; and additional functional services include providing computing services including logical operations for the data to be processed, wherein logical operations include but are not limited to: an exclusive OR (XOR) operation, AND operation, OR operation, NOT operation, and logical shift operation.

Figure 9:
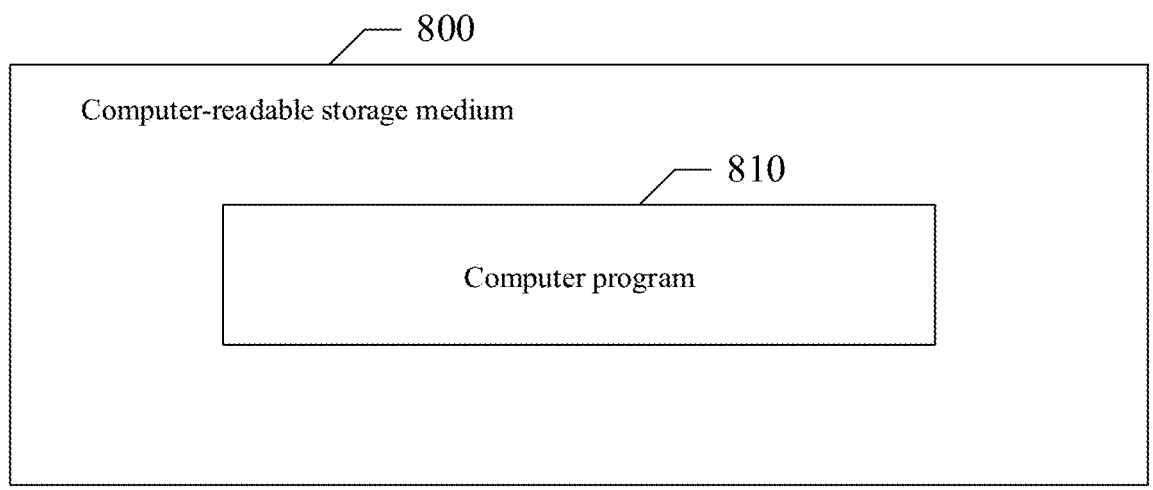
FIG. 9 is a block diagram of a computer-readable storage medium according to an implementation of the present application.

FIG. 9 is a block diagram of a computer-readable storage medium according to an implementation of the present application. According to the fifth aspect of the present application, an implementation of the present application provides a computer-readable storage medium. The computer-readable storage medium 800 stores a computer program 810. When being executed by a processor, the computer program 810 can implement the operation method of the electronic device in above technical solution. The operation method includes: sending, by a host in the electronic device, a first command; feeding back, by a memory system in the electronic device, a state of a multi-mode circuit in the memory system in response to the first command, the first command instructing to query the state of the multi-mode circuit; sending, by the host, a second command in response to a feedback that the multi-mode circuit in the memory system is in an idle state; performing, by the multi-mode circuit in the memory system, computation processing on data to be processed according to requirements of configuration parameters in response to the second command, the second command includes at least the configuration parameters corresponding to an additional functional service provided by the multi-mode circuit when being idle; sending, by the host, a third command, the third command instructing to query a result of the computation corresponding to the additional functional service; and feeding back, by the memory system, the result of the computation in response to the third command.

The methods disclosed in the method implementations provided in the present disclosure can be combined arbitrarily to obtain new method implementations unless there is a conflict.

The features disclosed in the several device implementations provided in the present disclosure can be combined arbitrarily to obtain new device implementations unless there is a conflict.

It should be understood that reference throughout the specification to "one implementation" or "an implementation" means that a example feature, structure or characteristic related to an implementation is included in at least one implementation of the present application. Thus, appearances of "in one implementation" or "in an implementation" in various places throughout the specification are not necessarily referring to the same implementation. Furthermore, the example features, structures or characteristics may be combined in any suitable manner in one or more implementations. It should be understood that in various implementations of the present application, the serial numbers of the above-mentioned processes do not mean the order of execution, and the execution order of the processes should be determined by their functions and inherent logic, rather than limiting implementation process of the implementations of the present application. The serial numbers of the abovementioned implementations of the present application are for description only, and do not represent the advantages and disadvantages of the implementations.

The forgoing description is only example implementations of the present application, and does not limit the patent scope of the present application. Under the inventive concept of the present application, the equivalent structural transformation made by using the contents of descriptions and accompanying drawings of the application or direct/indirect application to other relevant technical fields are encompassed in the patent protection scope of the present application.

What is claimed is:

1. A memory system comprising:
    a memory device;
    a multi-mode circuit having data computing and processing capabilities and configured to:
        provide a main functional service when in a busy state,
        provide an additional functional service when in an idle state, wherein the main functional service comprises implementation of normal access operations to data stored in the memory device, and the additional functional service comprises implementation of computing services other than the normal access operations to the data stored in the memory device,
        perform, when in the idle state, a computation on data to be processed according to requirements of configuration parameters corresponding to the additional functional service in response to receiving a command from a host external to the memory system, wherein the command comprises the configuration parameters; and
    a processor coupled to the memory device and the multi-mode circuit and configured to:
        control the memory device and the multi-mode circuit.

2. The memory system of claim 1, wherein the multi-mode circuit comprises at least one of:
    an encryption circuit, a decryption circuit, an error correction encoding circuit, an error correction decoding circuit, a data randomization encoding circuit, or a data randomization decoding circuit.

3. The memory system of claim 2, wherein:
    the multi-mode circuit comprises the encryption circuit; and
    the main functional service comprises encrypting and encoding first data in data to be stored to obtain check data, the check data used to verify whether the first data has been tampered with.

4. The memory system of claim 2, wherein the additional functional service comprises a computing service that provides secure hashing algorithms for data to be processed.

5. The memory system of claim 1, wherein the command is a second command, and wherein
    the processor is configured to:
    receive a first command, the first command instructing to query a state of the multi-mode circuit;
    in response to the first command, feed back the state of the multi-mode circuit; and
    in response to the multi-mode circuit being in the idle state, receive the second command, the second command comprising at least configuration parameters corresponding to the additional functional service;
    the processor is further configured to:
    receive a third command, the third command instructing to query a result of the computation; and
    in response to the third command, feed back the result of the computation.

6. The memory system of claim 5, wherein the processor is configured to:
    implement at least one of the first command or the second command through a command of a small computer system interface (SCSI) bus.

7. The memory system of claim 5, wherein the processor is configured to:
    receive the third command through a read interface with a priority higher than a preset value; and
    feed back the result of the computation through a task.

8. The memory system of claim 1, wherein the memory device comprises a three-dimensional NAND memory.

9. An electronic device comprising:
    a host; and
    a memory system coupled to the host; wherein:
    the host is configured to send a first command, the first command instructing to query a state of a multi-mode circuit in the memory system;
    the memory system is configured to: in response to the first command, feed back the state of the multi-mode circuit;
    the host is further configured to: in response to a feedback that the multi-mode circuit is in an idle state, send a second command, the second command comprises at least configuration parameters corresponding to an additional functional service provided by the multi-mode circuit when being idle;
    the multi-mode circuit is configured to: in response to the second command, perform a computation on data to be processed according to requirements of the configuration parameters;
    the host is further configured to: send a third command, the third command instructing to query a result of the computation corresponding to the additional functional service; and
    the memory system is further configured to feed back the result of the computation in response to the third command.

10. The electronic device of claim 9, wherein the multi-mode circuit comprises at least one of:
    an encryption circuit, a decryption circuit, an error correction encoding circuit, an error correction decoding circuit, a data randomization encoding circuit, or a data randomization decoding circuit.

11. The electronic device of claim 9, wherein the host is further configured to:
    in response to the feedback of the idle state, send the data to be processed.

12. The electronic device of claim 9, wherein the multi-mode circuit is configured to provide a main functional service when in a busy state, the main functional service comprising implementation of normal access operations to data stored in a memory device of the memory system.

13. The electronic device of claim 12, wherein the main functional service comprises encrypting and encoding first data in data to be stored to obtain check data, the check data used to verify whether the first data has been tampered with.

14. The electronic device of claim 12, wherein the additional functional service comprises a computing service that provides secure hashing algorithms for data to be processed.

15. The electronic device of claim 9, wherein the memory system is configured to:
implement at least one of the first command or the second command through a command of a small computer system interface (SCSI) bus.

16. The electronic device of claim 9, wherein the memory system is configured to:
receive the third command through a read interface with a priority higher than a preset value; and
feed back the result of the computation through a task.

17. The electronic device of claim 9, wherein the memory system comprises a Solid State Driver (SSD).

18. A method of operating an electronic device, comprising:
sending, by a host in the electronic device, a first command;
feeding back, by a memory system in the electronic device, a state of a multi-mode circuit in the memory system in response to the first command, the first command instructing to query the state of the multi-mode circuit;
sending, by the host, a second command in response to a feedback that the multi-mode circuit in the memory system is in an idle state;
performing, by the multi-mode circuit in the memory system, a computation on data to be processed according to requirements of configuration parameters in response to the second command, the second command comprising at least the configuration parameters corresponding to an additional functional service provided by the multi-mode circuit when being idle;
sending, by the host, a third command, the third command instructing to query a result of the computation corresponding to the additional functional service; and
feeding back, by the memory system, the result of the computation in response to the third command.

19. The method of claim 18, wherein the multi-mode circuit comprises at least one of:
an encryption circuit, a decryption circuit, an error correction encoding circuit, an error correction decoding circuit, a data randomization encoding circuit, or a data randomization decoding circuit.

20. The method of claim 18, wherein:
the multi-mode circuit is configured to provide a main functional service when in a busy state, the main functional service comprising implementation of normal access operations to data stored in a memory device of the memory system; and
the additional functional service comprises a computing service that provides secure hashing algorithms for data to be processed.

* * * * *